United States Patent [19]

Bowden et al.

[11] Patent Number: 4,891,283

[45] Date of Patent: Jan. 2, 1990

[54] INSOLUBLE MIXED HEAVY METAL POLYSULFIDE CATHODES

[75] Inventors: William L. Bowden, Nashua, N.H.; David L. DeMuth, Maynard, Mass.; Luverne H. Barnette, Derry, N.H.

[73] Assignee: Duracell Inc., Bethel, Conn.

[21] Appl. No.: 853,098

[22] Filed: Apr. 17, 1986

[51] Int. Cl.$^4$ ............................................. H01M 4/58
[52] U.S. Cl. .................................... 429/194; 429/218; 429/220; 429/221
[58] Field of Search ................ 429/194, 218, 220, 221

[56] References Cited

U.S. PATENT DOCUMENTS

| | | | |
|---|---|---|---|
| 4,125,687 | 11/1978 | DiSalvo et al. | 429/194 |
| 4,136,233 | 1/1979 | Eisenberg | 429/218 X |
| 4,390,604 | 6/1983 | Evans et al. | 429/221 X |
| 4,419,422 | 12/1983 | Leger et al. | 429/194 |
| 4,481,267 | 11/1984 | Bowden et al. | 429/194 |

*Primary Examiner*—Stephen J. Kalafut
*Attorney, Agent, or Firm*—Ronald S. Cornell; James B. McVeigh

[57] ABSTRACT

Mixed heavy metal polysulfides which are insoluble in non-aqueous electrolytes and having the formula $$M(1)_w^{+n} M(2)_x^{+m} (S_y)_z^{-2}$$

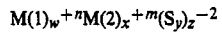

(wherein M(1) and M(2) are different heavy metal atoms, n and m are integers representing the valence states of M(1) and M(2) respectively, w and x are integers representing the stoichiometry of M(1) and M(2) respectively in the polysulfide, S is sulfur, $nw+mx=2z$ and y is greater than 4.5) are utilized as very high energy density cathodes in non-aqueous electrochemical cells.

14 Claims, No Drawings

INSOLUBLE MIXED HEAVY METAL POLYSULFIDE CATHODES

This invention relates to metal sulfides and particularly to metal polysulfides utilized as cathode materials in non-aqueous electrochemical cells.

Elemental sulfur has an extremely high theoretical electrochemical capacity (1.6 A-Hr/g) and in fact has been utilized as a cathode in electrochemical cells. However, such use of sulfur has been limited by various shortcomings which severely curtailed the actual attainment of such high capacity and which further limited utilization of sulfur in many cell applications. Sulfur is almost insulative with a very low ionic and electronic conductivity, and at least electronic conductivity of the cathode material is necessary in order to obtain reasonably full utilization thereof. Thus, sulfur cathodes have required massive capacity reducing inclusions on non-cathode active electronic conductors. In solid state cell applications further capacity reducing non-cathode active or low capacity ionic conductors have been further required.

In addition to its low conductivity sulfur has a relatively high vapor pressure and dissolution rate with resultant tendency to reduce cell life by internal cell short circuiting, particularly on storage at elevated temperatures. Sulfur cathodes have thus been generally utilized only in elevated temperature cells wherein the sulfur is in the molten state during operation, with increased conductivity and wherein the molten sulfur is, of necessity, fully contained.

In order to at least partially utilize the inherent capacity of sulfur, metal sulfides such as PbS, AgS, and the like were utilized as cathodes, particularly in solid state cells. Though such materials did not have the detrimental high vapor pressure or dissolution of the elemental sulfur they also did not provide capacities anywhere near that of the theoretical sulfur capacity.

Metal disulfides such as $FeS_2$, $CoS_2$, and $NiS_2$ because of their relatively higher sulfur content provided higher capacities than the monosulfide materials and have been effectively utilized in cells, particularly in elevated temperature operating cells. The theoretical capacity of $FeS_2$ for example is 0.730 A-Hr/g with about 0.700 A-Hr/g having been actually obtained. Capacities of such materials were however still not favorably comparative to that of the elemental sulfur.

Another class of metal sulfides are the transition metal intercalation compounds. This class is best exemplified by titanium disulfide ($TiS_2$) Cathodes made from these materials are best suited for rechargeable cells because of the complete reversibility of intercalation reactions with alkali metal ions. However, such materials provided less primary capacity than other metal sulfides since the sulfur itself does not enter the electrochemical cell reaction.

Alkali metal polysulfides such as $Li_2S_x$ and $Na_2S_x$ with $x<1$ represent another class of metal sulfides which have been used as cathodes in electrochemical cells. Such materials have in fact provided relatively good capacities however several serious disadvantages have accompanied their use. The non-aqueous electrolytes of cells having the alkali metal polysulfide cathodes have had the tendency of becoming increasingly more viscous ith accompanying loss of conductivity and severely reduced discharge rate capability. Additionally the alkali metal polysulfides are at least partially soluble in common electrolyte solvent and are accordingly likely to cause cell self discharge over extended periods of time.

Commonly assigned U.S. Pat. No. 4,481,267 discloses a novel class of metal polysulfide materials utilized as cathodes in non-aqueous electrochemical cells. These metal polysulfides are characterized by having an atomic ratio of sulfur to transition metal of greater than 3.5 to 1. Examples of such polysulfides include $CoS_{4.5}$, $NiS_{4.5}$, $CuS_{3.7}$, and $FeS_{4.5}$. These materials come the closest to the theoretical capacity of sulfur, having theoretical capacities slightly greater than 1.0 A-Hr/g.

These heavy metal polysulfides can be prepared by precipitation from mixing an aqueous solution of the metal chloride salt with an aqueous polysulfide solution. Suitable polysulfide solutions are prepared from ammonium polysulfide or sodium polysulfide, for example. Copending U.S. application No. 769,036 discloses a method of preparing heavy metal polysulfides using ammonium polysulfide. This method provides products, except for the heavy metal polysulfide, which are volatile and can be driven off by heating thus simplifying the separation. When polysulfides prepared by this method or the method disclosed in U.S. Pat. No. 4,481,267 are not heated they have a sulfur to metal ratio from 3.5/1 to as high as 5/1. While these materials are cathode active as disclosed in U.S. Pat. No. 4,481,267 it has been found that there is less degradation on storage if the heavy metal polysulfides are first heated to a constant weight value before being made into cathodes. Heating under vacuum to a constant weight removes loosely bound sulfur and results in polysulfides having a sulfur content from between 3.5/1 to 4.5/1.

Generally speaking the mixed heavy metal polysulfides of the present invention are of the stoichiometric formula $M(1)M(2)S_y$ wherein $M(1)$ and $M(2)$ are different heavy metal atoms, S is sulfur, and y is greater than or equal to 4.5. When mixed heavy metals are used in the preparation of the polysulfide it has been discovered that the polysulfide has a higher sulfur content after heating under vacuum than when a single heavy metal is used. This in turn gives the mixed heavy metal polysulfide a higher electrochemical capacity.

The present invention was discovered when a solution containing salts of two different heavy metals was mixed with an aqueous solution of sodium polysulfide. Specifically, when an aqueous equimolar solution of $FeSO_4$ and $CoSO_4$ was mixed with an excess of an aqueous sodium polysulfide solution a material precipitated which, after washing and drying, analyzed as $Co_{2.3}Fe_{.7}S_{15}$. This material has an atomic ratio of sulfur to metal of 5/1 after vacuum drying at 110° C., which is higher than that typically found in the single heavy metal polysulfides after vacuum drying at 110° C. Changing the concentration of the salts in the initial solution results in changing the composition of the mixed heavy metal polysulfide. Also, changing the metals in the salts would lead to mixed heavy metal polysulfides of different composition. Clearly, any metal salt which is soluble in water could be used in the preparation of a mixed heavy metal polysulfide. Such salts would include the salts of copper, titanium, vanadium, chromium, molybdenum, tungsten, iron, ruthenium, cobalt, rhodium, and nickel.

In addition to preparation from aqueous solutions it is also possible to prepare mixed heavy metal polysulfides from organic solvents such as dimethyl formamide or diethyl ether. Instead of ammonium polysulfide, the sulfur can be provided from $H_2S$ and from elemental sulfur itself.

It is an advantage of the present invention that mixed heavy metal polysulfides can be prepared and used as cathode active materials in electrochemical cells. The electrolyte used in the cells could be aqueous, non-aqueous, or solid. When the electrolyte is non-aqueous the anode can be comprised of an alkali or alkaline earth metal such as lithium.

It is an additional advantage that the mixed heavy metal polysulfides can be made more cheaply than the single heavy metal polysulfides. For example, $Co_2S_7$ is a polysulfide that is suitable for use as a cathode material but is expensive due to the cost of cobalt. By replacing some of the cobalt with a different and cheaper heavy metal such as iron the cost of the cathode material drops.

It is an additional advantage that the mixed heavy metal polysulfides do not always exhibit properties similar to the corresponding single metal polysulfides. For example, $Fe_3S_8$ is very air sensitive and decomposes readily. However a cobalt-iron polysulfide does not suffer from this problem.

It is an object of the present invention to provide mixed heavy metal polysulfide materials that are useful as cathode active substances in electrochemical cells.

It is another object of the present invention to provide polysulfide materials that are cheaper to produce than previously known polysulfide materials but provide at least the same capacity.

These advantages and objects will become clear in light of the following examples. It is understood that such examples are illustrative in nature and that other mixed heavy metal polysulfides can be prepared. Accordingly, the details described in such examples are not to be construed as limitations on the present invention. Unless otherwise indicated all parts are parts by weight.

EXAMPLE 1

An aqueous solution that is equimolar in $FeSO_4$ and $CoSO_4$ is prepared. To this is added an aqueous solution of sodium polysulfide. The amount of sodium polysulfide added is less than the amount needed to precipitate all of the $Co^{2+}$ and $Fe^{2+}$ ions. A black precipitate is formed which is separated by filtration. The black precipitate is washed and then dried under vacuum at 110° C. until a constant weight is obtained. The resulting mixed heavy metal polysulfide is analyzed and found to have a formula $Co_{2.3}Fe_{.7}S_{15}$. This polysulfide has an atomic ratio of sulfur to metal of 5/1, a value which is greater than that generally found in single heavy metal polysulfides.

EXAMPLE 2

A solution of $(NH_4)_2MoS_4$ in dimethyl formamide(DMF) is prepared. To this solution is added a solution of elemental sulfur in DMF. Enough sulfur is added to react the $MoS_4^{-2}$ anion. The polysulfide anion precipitates as $(NH_4)_2MoS_9$ and this is separated by filtration. The $(NH_4)_2MoS_9$ is then added to a solution of $CuCl_2$ in DMF. The $CuCl_2$ is in molar excess of the $(NH_4)_2MoS_9$. Diethyl ether is added until the solution becomes cloudy. This solution is then chilled and crystals of $CuMoS_9$ are formed. This mixed heavy metal polysulfide has an atomic ratio of sulfur to metal of 4.5/1.

EXAMPLE 3

An ammoniacal aqueous solution of NH is prepared. This solution is then saturated with $H_2S$ to form $(NH_4)V_3S_4$ which precipitates out as dark crystals. These dark crystals are separated from the solution by filtration. The separated crystals are then dissolved in a dilute aqueous sodium hydroxide solution. Sulfur is then added with stirring to form $(NH_4)_3VS_8$. A solution of cobalt(II) chloride complexed with ammonia is then added to give $Co_3(VS_8)_2$.

COMPARATIVE EXAMPLE A

Button type cells were made with the dimensions of 0.95" (24.5 mm) outside diameter by 0.12" (3 mm) height with each containing a lithium foil anode(440 mA-Hr) pressed on a nickel grid welded to the inside bottom of the cell container. The cell contained an electrolyte of 0.75M $LiClO_4$ in 1:1 (volume) of propylene carbonate and dimethoxy ethane. The cathode was comprised of 100 mg of $Co_2S_7$ formed into a disk shape having a surface area of 3cm$^2$. One cell was discharged at high rate (500 $\Omega$) and gave 800 mA-Hr/g to a 1 V cutoff. Another cell was discharged at low rate (2 $\Omega$) and gave 1000 mA-Hr/g to a 1 V cutoff. Both discharges have one major voltage plateau at 1.8 V and a shorter plateau at 1.4 V.

COMPARATIVE EXAMPLE B

Button type cells were constructed identical to those in Comparative Example A except that the cathode was comprised of 100 mg of $Fe_3S_8$. One cell was discharged at high rate (500 $\Omega$) and one cell at low rate (2 $\Omega$). Each discharge gave roughly the same capacity of 900 mA-Hr/g to a 1 V cutoff. The discharges had two voltage plateaus of roughly equal duration, the first at 1.6 V and the second at 1.4 V.

EXAMPLE 4

Button type cells were constructed identical to those in Comparative examples A and B except that the cathode material was comprised of 100 mg of $Co_{2.3}Fe_{.7}S_{15}$. One cell was discharged at high rate (500 $\Omega$) and gave 1100 mA-Hr/g to a 1 V cutoff. A second cell was discharged at low rate (2 $\Omega$) and gave 1300 mA-Hr/g to a 1 V cutoff. Both discharges had two voltage plateaus of roughly equivalent duration, the first at 1.8 V and the second at 1.4 V. This data provides two pieces of evidence that $Co_{2.3}Fe_{.7}S_{15}$ is a discrete new material and not a mixture of the cobalt and iron polysulfides. The first is that the capacity is greater than the sum of the capacities of the requisite amount of cobalt and iron polysulfides. The second is the absence of a voltage plateau at 1.6 V which would be present of there was any iron polysulfide present.

The mixed heavy metal polysulfide materials of the present invention are suitable for use in both aqueous and non-aqueous electrochemical cells since they are insoluble in the common aqueous and non-aqueous solvents. Such solvents include propylene carbonate, acetonitrile, dimethoxyethane, dioxolane, gamma-butyrolactone, tetrahydrofuran, methyl formate, dimethylsulfoxide, sulfur dioxide, aqueous alkaline solutions and the like. In addition, such mixed heavy metal polysulfides are useful as high capacity cathodes in solid state cells wherein the electrolyte is comprised of ionically conductive metal salts in the solid state, such as LiI.

In order to take full advantage of the high energy densities of the polysulfide materials of the present invention it is preferred that they are utilized in non-aqueous cells having alkali or alkaline earth metal anodes such as lithium wherein they provide cells with typical voltages between about 1.5 and 2 volts.

Although the mixed heavy metal polysulfides given in the examples were limited to just two different heavy metals it would be possible to prepare mixed heavy metal polysulfides comprised of three or more different heavy metals. This would be accomplished by preparing a solution of three or more heavy metal salts from which the mixed heavy metal polysulfide is precipitated.

The above examples were given for the purposes of illustrating the present invention. Changes may be made in particular heavy metals, ratios of components, cell structure, components of such cell and the like without departing from the scope of the present invention as defined in the following claims:

What is claimed is:

1. An electrochemical cell comprising an anode, an electrolyte, and a solid
   active cathode; wherein said cathode is comprised of one or more mixed heavy metal polysulfides having the formula $$M(1)_w{}^{+n}M(2)_x{}^{+m}(S_y)_z{}^{-2}$$

wherein M(1) and M(2) are different heavy metal atoms, n and m are integers representing the valence states of M(1) and M(2) respectively, w and x are non zero integers representing the stoichiometry of M(1) and M(2) respectively in the polysulfide, S is sulfur, $nw + mx = 2z$ and y is greater than 4.5.

2. The electrochemical cell of claim 1 wherein said heavy metals are selected from the group consisting of copper, vanadium, molybdenum, iron, and cobalt.

3. The electrochemical cell of claim 1 wherein the anode is comprised of a metal selected from alkali or alkaline earth metals.

4. The electrochemical cell of claim 3 wherein said anode is comprised of lithium.

5. The electrochemical cell of claim 4 wherein one of the heavy metals is cobalt.

6. The electrochemical cell of claim 4 wherein one of the heavy metals is molybdenum.

7. The electrochemical cell of claim 4 wherein one of the heavy metals is vanadium.

8. The electrochemical cell of claim 4 wherein one of the heavy metals is iron.

9. The electrochemical cell of claim 4 wherein one of the heavy metals is copper.

10. The electrochemical cell of claim 4 wherein M(1) is iron and M(2) is cobalt.

11. The electrochemical cell of claim 1 wherein said electrolyte is a fluid and said mixed heavy metal polysulfide is substantially insoluble therein.

12. The electrochemical cell of claim 11 wherein said fluid electrolyte is non-aqueous.

13. The electrochemical cell of claim 1 wherein said electrolyte is a solid.

14. A non-aqueous electrochemical cell comprising a lithium anode, a fluid non-aqueous electrolyte and a cathode comprised of one or more mixed heavy metal polysulfides having an empirical stoichiometric formula $M(1)M(2)S_y$ wherein M(1) and M(2) are different heavy metals selected from the group consisting of copper, vanadium, molybdenum, iron, and cobalt; S is sulfur and y is greater than or equal to 4.5.

* * * * *